Patented Sept. 5, 1933

1,925,208

UNITED STATES PATENT OFFICE

1,925,208

SPIRIT VARNISHES

Hermann Schladebach, Dessau in Anhalt, and Herbert Hähle, Dessau-Ziebigk, Germany, assignors to General Aniline Works, Inc., New York, N. Y., a corporation of Delaware No Drawing. Application August 13, 1928, Serial No. 299,455, and in Germany August 19, 1927

6 Claims. (Cl. 134—26)

The present invention relates to spirit varnishes colored or to be colored fast to light, and to the manufacture thereof.

It has not hitherto been possible to color spirit varnishes, that is to say solution of natural or artificial resins in spirit with or without addition of a softening agent or some other substance, by means of a basic dyestuff so that the color is fast to light.

According to this invention, such varnishes can be made suitable for being colored fast to light or may be colored fast to light if, before, together with or after the addition of the basic dyestuff, there is added a small proportion of a compound which prevents change of the dyestuff by the varnish under the influence of light. Such compounds are strong organic and inorganic acids, for example trichloracetic acid, perchloric acid, hydrochloric acid, nitric acid, sulfuric acid and nitrous acid; also salts which have acid reaction, such as aluminium chloride, ferric chloride, cupric chloride and an alkali metal or ammonium bisulfate. The colored varnishes thus obtained yield on paper, wood, metal and other substances, coatings which are highly lustrous, clear and of essential better fastness to light than those obtained by means of the usual spirit varnishes colored with the same dyestuffs. The invention renders it possible to use the extraordinarily bright triarylmethane-dyestuffs which are very unstable in spirit varnishes, even in cases which demand a very high degree of fastness to light in the varnish.

*Example 1.*—In 100 parts of commercial spirit varnish (containing as essential part a resin, for instance shellac) there is dissolved 0.5 part of perchloric acid (concentrated). There is thus obtained a varnish which can be colored fast to light. By using 0.25 part of Malachite green crist, there is produced for example a beautiful green coloring fast to light.

*Example 2.*—In 100 parts of warm commercial spirit varnish there are dissolved 0.25 part of Victoria blue B, highly concentrated, whereupon 0.5 part of concentrated nitric acid is added. The varnish is of blue color fast to light.

It is obvious to all skilled in the art that the invention is not limited to the foregoing examples, or to the details given therein. Other basic dyestuffs or other compounds having a strong acid reaction mentioned above or their equivalents may be used. The successive order in which the ingredients are added to the varnish may be varied without changing its qualities. The quantities of the strong acid compound used may be varied in wide limits but we prefer to use it in quantities less than 1 per cent. calculated on the quantity of ready made spirit varnish.

In the claims following hereafter, the term "spirit varnishes" is intended to cover only the true spirit varnishes, namely, solutions of resins from which the resin film is produced by evaporation of the spirit used as solvent for the resins.

What we claim is:

1. Spirit varnishes containing perchloric acid.

2. Colored spirit varnishes, fast to the action of light, containing a basic dye and a compound of strong acid reaction of the group consisting of trichloroacetic acid, perchloric acid, hydrochloric acid, nitric acid, sulfuric acid, nitrous acid, aluminium chloride, ferric chloride, cupric chloride, alkali metal bisulfate and ammonium bisulfate.

3. Colored spirit varnishes fast to the action of light containing a basic dye and perchloric acid.

4. Colored spirit varnishes fast to the action of light containing a basic dye of the triarylmethane series and perchloric acid.

5. In the manufacture of spirit varnishes colored with a basic dye, the step which comprises adding to the varnish, at any stage of its preparation, a compound of strong acid reaction of the group consisting of trichloroacetic acid, perchloric acid, hydrochloric acid, nitric acid, sulfuric acid, nitrous acid, aluminium chloride, ferric chloride, cupric chloride, alkali metal bisulfate and ammonium bisulfate.

6. In the manufacture of spirit varnishes colored with a basic dye, the step which comprises adding to the varnish, at any stage of its preparation, perchloric acid.

HERMANN SCHLADEBACH.
HERBERT HÄHLE.